US012580686B2

(12) United States Patent
Lu et al.

(10) Patent No.: US 12,580,686 B2
(45) Date of Patent: Mar. 17, 2026

(54) METHOD FOR PROCESSING SIDELINK RETRANSMISSION RESOURCES, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 373 days.

(21) Appl. No.: 18/367,740

(22) Filed: Sep. 13, 2023

(65) Prior Publication Data

US 2023/0421297 A1      Dec. 28, 2023

Related U.S. Application Data

(63) Continuation of application No. PCT/CN2021/095891, filed on May 25, 2021.

(51) Int. Cl.
H04W 76/20 (2018.01)
H04L 1/08 (2006.01)
H04L 5/00 (2006.01)

(52) U.S. Cl.
CPC .............. H04L 1/08 (2013.01); H04L 5/0053 (2013.01); H04W 76/20 (2018.02)

(58) Field of Classification Search
None
See application file for complete search history.

(56) References Cited

U.S. PATENT DOCUMENTS

| | | | | |
|---|---|---|---|---|
| 11,646,829 | B2* | 5/2023 | Tseng | H04W 24/08 370/329 |
| 2021/0037468 | A1 | 2/2021 | Huang | |
| 2021/0051588 | A1 | 2/2021 | Wu | |
| 2022/0095326 | A1* | 3/2022 | Li | H04L 1/1896 |
| 2022/0353946 | A1* | 11/2022 | Kanamarlapudi | H04W 72/23 |
| 2022/0400531 | A1* | 12/2022 | Back | H04W 76/28 |

(Continued)

FOREIGN PATENT DOCUMENTS

| | | |
|---|---|---|
| CN | 111082900 A | 4/2020 |
| CN | 111556590 A | 8/2020 |
| CN | 112312526 A | 2/2021 |

OTHER PUBLICATIONS

InterDigital, "Summary of [POST113-e][703][V2X/SL] Details of Timer (InterDigital)", 3GPP TSG-RAN WG2 Meeting #113-bis-e R2-2102801 Electronic Meeting, Apr. 12-20, 2021, cited in section 2.4. 66 pages.

(Continued)

*Primary Examiner* — Anh Vu H Ly
(74) *Attorney, Agent, or Firm* — BAYES PLLC

(57) ABSTRACT

Provided is a method for processing a sidelink retransmission resource, a terminal device and a network device. A first terminal device acquires a sidelink retransmission grant resource, and ignores the sidelink retransmission grant resource in response to the sidelink retransmission grant resource being within a duration when a second terminal device is in a discontinuous reception (DRX) inactive state.

20 Claims, 16 Drawing Sheets

┌─ S101

A first terminal device acquires a sidelink retransmission grant resource

┌─ S102

The first terminal device ignores the sidelink retransmission grant resource in response to the sidelink retransmission grant resource being within a duration when a second terminal device is in DRX inactive state

(56)     References Cited

U.S. PATENT DOCUMENTS

2023/0300752 A1*   9/2023  Li  ........................ H04W 76/14
                                                    370/310
2024/0008000 A1*   1/2024  Li  ..................... H04W 28/0278
2024/0015767 A1*   1/2024  Back  ................... H04L 5/0055

OTHER PUBLICATIONS

Lenovo et al, "Discontinuous reception and transmission in SL", 3GPP TSG-RAN WG2 Meeting #112 electronic R2-2009696 Online, Nov. 2-13, 2020, cited in the whole document, 7 pages.

International Search Report in the international application No. PCT/CN2021/095891, mailed on Jan. 19, 2022. 6 pages with English translation.

Written Opinion of the International Search Authority in the international application No. PCT/CN2021/095891, mailed on Jan. 19, 2022. 6 pages with English translation.

"3rd Generation Partnership Project; Technical Specification Group Radio Access Network; NR; Medium Access Control (MAC) protocol specification (Release 16)", 3GPP TS 38.321 V16.3.0 (Dec. 2020), cited in sections 5.7, 5.22. 155 pages.

"3rd Generation Partnership Project; Technical Specification Group Radio Access Network; NR; Radio Resource Control (RRC) protocol specification (Release 16)", 3GPP TS 38.331 V16.3.1 (Jan. 2021), cited in section 5.8.8. 929 pages.

* cited by examiner eNB

Sidelink eNB

Sidelink transmission resource request

Sidelink resource allocation

Sidelink data

UE1

UE2

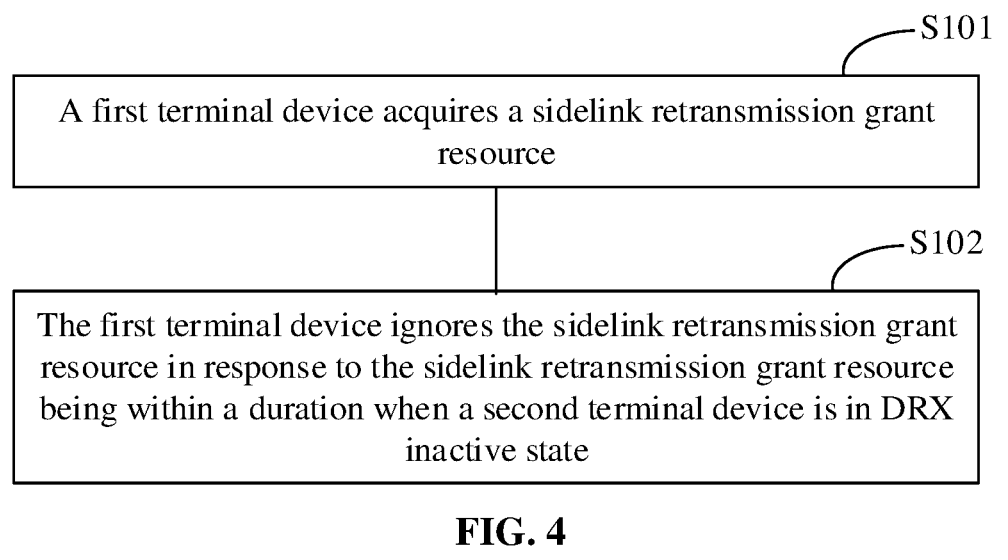

```
                                                       ┌─S101
┌───────────────────────────────────────────────────────────┐
│  A first terminal device acquires a sidelink retransmission grant  │
│                       resource                              │
└───────────────────────────────────────────────────────────┘
                                                       ┌─S102
┌───────────────────────────────────────────────────────────┐
│  The first terminal device ignores the sidelink retransmission grant │
│  resource in response to the sidelink retransmission grant resource  │
│  being within a duration when a second terminal device is in DRX     │
│                     inactive state                          │
└───────────────────────────────────────────────────────────┘
```

FIG. 4

Sidelink retransmission
grant resource 1

Receiving UE being in inactive DRX
state at the sidelink retransmission
grant resource 1

Ignore the sidelink retransmission
grant resource 1

Wait for a new retransmission
resource

Communication system 800

Terminal device    810

Network device    820

METHOD FOR PROCESSING SIDELINK RETRANSMISSION RESOURCES, TERMINAL DEVICE, AND NETWORK DEVICE

CROSS-REFERENCE TO RELATED APPLICATION

This application is a continuation of International Patent Application No. PCT/CN2021/095891 filed on May 25, 2021, the disclosure of which is incorporated by reference in its entirety.

BACKGROUND

Device to Device (D2D) and Vehicle to Everything (V2X, also known as Internet of Vehicles) technologies are important components of the mobile communication. In D2D or V2X scenarios, direct communication between devices is supported by a Sidelink (SL) transmission technology. Different from traditional cellular systems in which communication data is received or sent by a base station, the V2X system adopts a manner of terminal-to-terminal direct communication. Therefore, the V2X system has higher spectrum efficiency and a lower transmission delay. The V2X system supports two transmission modes: a mode-1 and a mode-2. In the mode-1, transmission resources for a terminal are allocated by a network, and the terminal transmits sidelink data on the sidelink according to the resources allocated by the network. In the mode-2, the terminal selects resources from a resource pool to perform sidelink transmission. There is a case that a receiving terminal is a user configured with a discontinuous reception (DRX). In this case, if the retransmission grant resources scheduled by the network are not within a duration when the receiving terminal is in a DRX active state, the sending terminal will not perform transmissions by using the retransmission grant resources. In this case, how to report feedback to the network is a problem that needs to be deeply studied and discussed.

SUMMARY

The present disclosure relates to the technical field of communications, and in particular to methods for processing a sidelink retransmission resource, a terminal device and a network device.

In view of this, embodiments of the present disclosure provide methods for processing a sidelink retransmission resource, a terminal device and a network device, which can optimize a processing flow of the sidelink retransmission resource after the DRX mechanism is introduced into the sidelink communication.

The embodiments of the present disclosure provide a method for processing a sidelink retransmission resource, including following operations. A first terminal device acquires a sidelink retransmission grant resource. In response to the sidelink retransmission grant resource being within a duration when a second terminal device is in a DRX inactive state, the first terminal device ignores the sidelink retransmission grant resource.

The embodiments of the present disclosure provide a method for processing a sidelink retransmission resource, including following operations. A network device allocates a sidelink retransmission grant resource to a first terminal device. The network device receives at least one of a negative acknowledgement (NACK) or cause information corresponding to the NACK from the first terminal device.

The network device reallocates a sidelink retransmission grant resource to the first terminal device based on DRX configuration information of the second terminal device and at least one of the NACK or the cause information.

The embodiments of the present disclosure also provide a terminal device, including a processor and a transceiver, where the processor is configured to cooperate with the transceiver to perform the method performed by the terminal device as described above.

The embodiments of the present disclosure also provide a network device including a processor and a transceiver, where the processor is configured to cooperate with the transceiver to perform the method performed by the network device as described above.

According to the embodiments of the present disclosure, in the sidelink transmission mode-1 and mode-2, in response to the sidelink retransmission grant resource being within the duration when a sending terminal is in a DRX inactive state, the sending terminal will ignore the sidelink retransmission grant resource, thereby reducing unnecessary information overhead and improving the overall performance of the system.

BRIEF DESCRIPTION OF THE DRAWINGS

FIG. 4 is a flowchart of a method for processing a sidelink retransmission resource on a terminal side according to an embodiment of the present disclosure.

DETAILED DESCRIPTION

Figure 1:
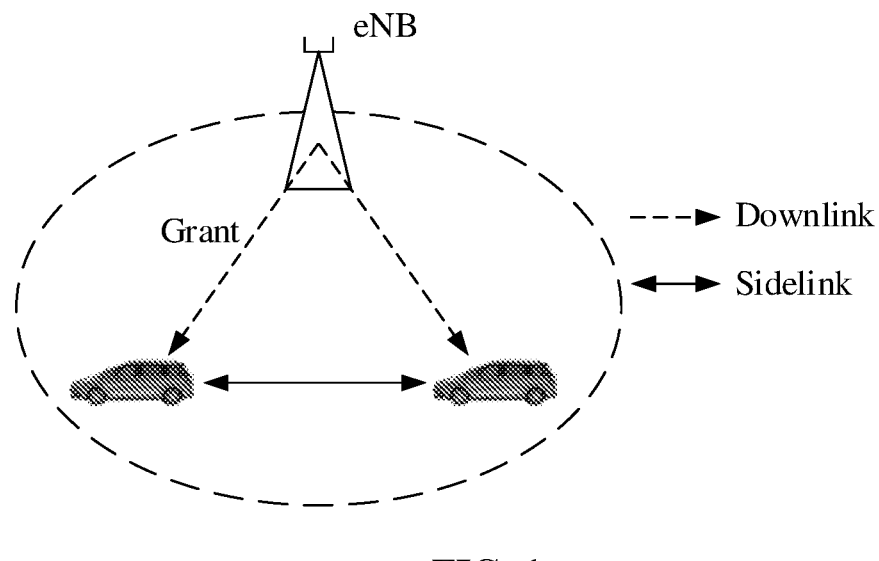
FIG. 1 is a schematic diagram of a sidelink communication system architecture according to an embodiment of the present disclosure.
Figure 2:
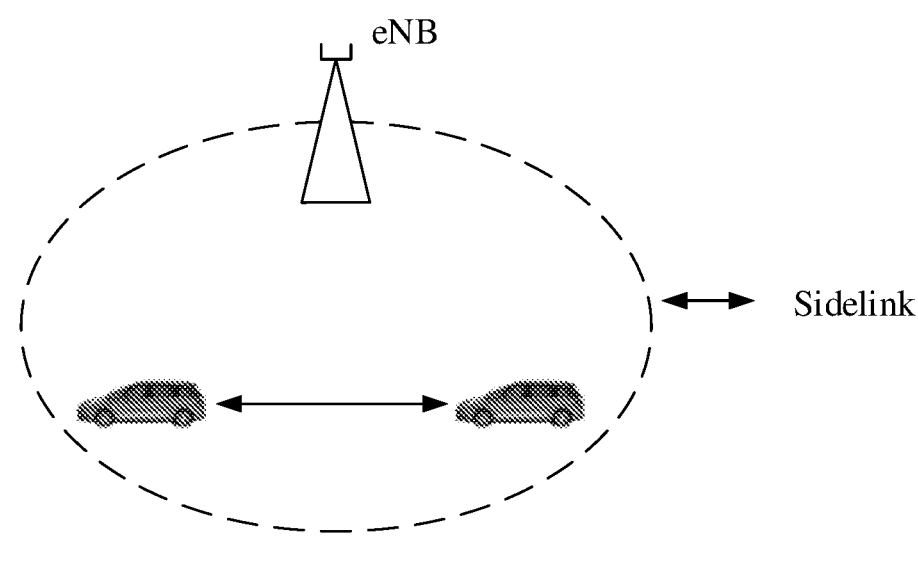
FIG. 2 is a schematic diagram of a sidelink communication system architecture according to an embodiment of the present disclosure.

The technical scheme in the embodiments of the present disclosure will be described below with reference to the drawings in the embodiments of the present disclosure.

The technical scheme in the embodiments of the present disclosure may be applied to various communication systems, such as: a global system of mobile communication (GSM) system, a code division multiple access (CDMA) system, a wideband code division multiple access (WCDMA) system, a general packet radio service (GPRS), a long term evolution (LTE) system, an advanced long term evolution (LTE) system, a new radio (NR) system, an evolution system for NR system, a LTE-based access to unlicensed spectrum (LTE-U) system, a NR-based access to unlicensed spectrum (NR-U) system, a non-terrestrial networks (NTN) system, a universal mobile telecommunication system (UMTS), a wireless local area network (WLAN), a wireless fidelity (Wi-Fi), a 5th-generation (5G) system or other communication systems.

Generally speaking, traditional communication systems support a limited number of connections and are easy to implement. However, with the development of communication technology, mobile communication systems will not only support traditional communication, but also support, for example, D2D communication, machine to machine (M2M) communication, machine type communication (MTC), vehicle to vehicle (V2V) communication, or V2X communication, etc. The embodiments of the present disclosure may also be applied to these communication systems.

Optionally, the communication system in the embodiments of the present disclosure may be applied to a carrier aggregation (CA) scenario, a dual connectivity (DC) scenario, and a standalone (SA) network distribution scenario.

The embodiments of the present disclosure are described in connection with a network device and a terminal device. The terminal device may also be referred to as user equipment (UE), an access terminal, a user unit, a user station, a mobile station, a remote station, a remote terminal, a mobile device, a user terminal, a terminal, a wireless communication device, a user agent or a user device, etc. The terminal device may be a station (ST) in the WLAN, a cellular telephone, a cordless telephone, a session initiation protocol (SIP) telephone, a wireless local loop (WLL) station, a personal digital assistant (PDA) device, a handheld device having a wireless communication function, a computing device or other processing device connected to a wireless modem, a vehicle-mounted device, a wearable device, a terminal device in a next generation communication system such as an NR network, or a terminal device in a future evolved public land mobile network (PLMN) network, etc.

In the embodiments of the present disclosure, the terminal device may be deployed on land, and include indoor or outdoor device, hand-held device, wearable device or vehicle-mounted device. The terminal device may also be deployed on the water (such as on the ships, etc.). The terminal device may also be deployed in the air (such as, in airplanes, in balloons and in satellites, etc.).

In the embodiments of the present disclosure, the terminal device may be a mobile phone, a Pad, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

By way of example and not limitation, in the embodiments of the present disclosure, the terminal device may also be a wearable device. The wearable device may also be referred to as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. The generalized wearable smart device has full functions and a large size, and the generalized wearable smart device may realize complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

In the embodiments of the present disclosure, the network device may be a device configured to communicate with a mobile device, and the network device may be an access point (AP) in a WLAN, a base transceiver station (BTS) in a GSM or CDMA, a NodeB (NB) in a WCDMA, an evolved Node B (eNB or eNodeB) in an LTE, a relay station or an access point, a vehicle-mounted device, a wearable device, a network device or a gNB in an NR network, a network device in a future evolved PLMN network or a network device in an NTN network, etc.

By way of example and not limitation, in the embodiments of the present disclosure, the network device may have mobility characteristics, for example, the network device may be a mobile device. Optionally, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Optionally, the network device may also be a base station located on land, water, etc.

In the embodiments of the present disclosure, the network device may provide a service for a cell, and the terminal device communicates with the network device through transmission resources (e.g., frequency resources, or spectrum resources) used by the cell. The cell may be a cell corresponding to the network device (e.g., base station), and the cell may belong to a macro base station or a base station corresponding to a small cell. The small cell may include a metro cell, a micro cell, a Pico cell, a Femto cell, etc. These small cells have characteristics of small coverage and low transmission power, and the small cells are suitable for providing a high-speed data transmission service.

It should be understood that the terms "system" and "network" are often used interchangeably herein. In the present disclosure, the term "and/or" is only an association relationship describing associated objects and represents that three relationships may exist. For example, A and/or B may represent three conditions: i.e., independent existence of A, existence of both A and B and independent existence of B. In addition, the character "I" in the present disclosure generally indicates that the relationship between the related objects is "or". In the description of the embodiments of the present disclosure, the term "correspondence" may mean that there is a direct correspondence or an indirect correspondence between the two, or may also mean that there is an association relationship between the two, or may also be a relationship between indication and being indicated, configuration and being configured, etc.

In order to clearly illustrate the idea of the embodiments of the present disclosure, a brief description is first given for relevant contents of sidelink (SL) transmission in the communication system.

For LTE D2D/V2X System

Two transmission modes are defined in LTE D2D/V2X system, namely a mode A and a mode B. With reference to FIG. 1, when the mode A is used, transmission resources for a terminal are allocated by a base station, and the terminal sends data on a sidelink according to the resources allocated by the base station. The base station may allocate resources for single transmission or allocate resources for semi-static transmission to the terminal. When the mode B is used, the terminal selects resources from a resource pool to perform data transmission. In 3rd Generation Partnership Project (3GPP), D2D is divided into different stages for study, which is described as follows.

Proximity based Service (ProSe): in the ProSe, by configuring time-domain positions of a resource pool (e.g., the resource pool is discontinuous in the time domain), a User Equipment (UE) may discontinuously send or receive data on the sidelink, thereby achieving the effect of power saving Vehicle to Everything (V2X): in the V2X, due to the continuous power supply for the vehicle-mounted system, the data transmission delay, rather than the power efficiency, is the main problem. Therefore, it is required in the system design that the terminal may perform continuous transmission and reception Further enhancements LTE Device to Device (FeD2D): in the FeD2D, a discussion suggests that the base station may configure DRX parameters for a remote terminal through a relay terminal. However, there is no conclusion on the specific details of how to configure the DRX.

For NR V2X System

On the basis of LTE V2X system, the NR V2X system is not limited to be applied to broadcast scenarios, but may also be extended to unicast scenarios and multicast scenarios.

Similar to the LTE V2X, the NR V2X defines the aforementioned two resource grant modes: the mode-1 and mode-2.

Different from the LTE V2X, in addition to a Hybrid Automatic Repeat request (HARQ) retransmission initiated by the UE without feedback, a feedback based HARQ retransmission is also introduced into the NR V2X, and the feedback based HARQ retransmission is not limited to be applied to the unicast communication, but also be applied to the multicast communication.

Similar to the LTE V2X, in the NR V2X, it may be considered that due to the continuous power supply for the terminal device, such as the vehicle-mounted system, the data transmission delay, rather than the power efficiency, is the main problem. Therefore, it is required in the system design that the terminal may perform continuous transmission and reception.

6

For a Resource Acquisition Manner in NR V2X Mode-1

Figure 3:
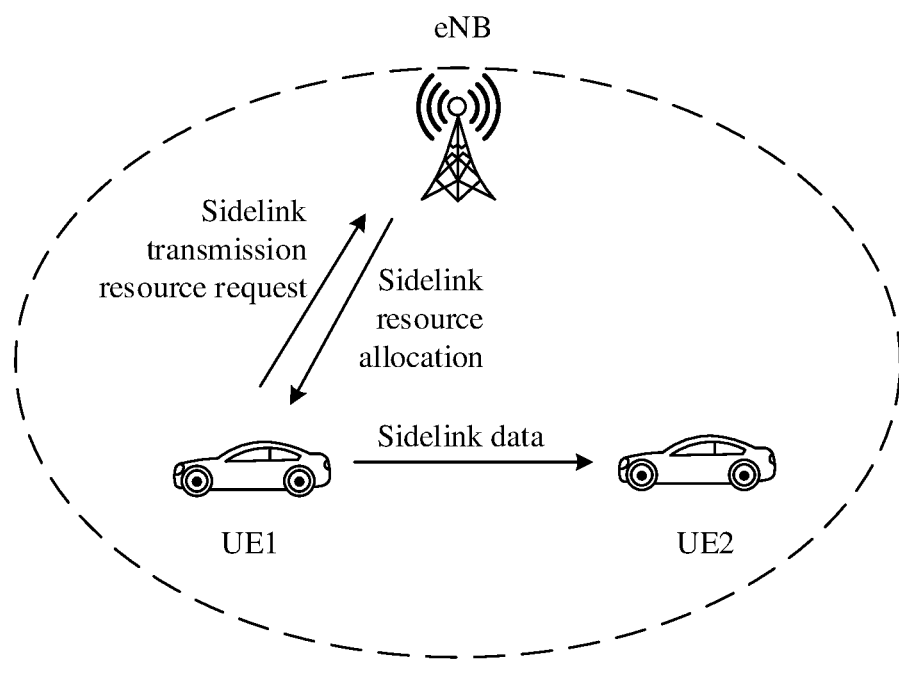
FIG. 3 is a schematic diagram of a sidelink communication system architecture according to an embodiment of the present disclosure.

When the terminal needs to send sidelink data, with reference to FIG. 3, the terminal may send a resource request to the base station, and the resource request includes a Scheduling Request (SR) and a Buffer Status Report (BSR). The base station allocates sidelink transmission resources to the terminal according to the BSR from the terminal, and the terminal sends sidelink data on the sidelink transmission resources allocated by the base station.

The resource allocation based on network scheduling may be divided into dynamic grant and configuration grant. For the dynamic grant, the network allocates sidelink transmission resources to the terminal through Downlink Control Information (DCI). Sidelink Configured Grant (SLCG) is introduced by taking an Uplink Configured Grant (UL CG) mechanism as reference. If the terminal is configured with sidelink configured grant transmission resources, when sidelink data arrives, the terminal may transmit the sidelink data by using the sidelink configured grant transmission resources, and does not request transmission resources to the network again. Therefore, the usage of the sidelink configured grant transmission resources may reduce the delay in sidelink transmission. The sidelink configured grant transmission resources are periodic transmission resources, so they may be adapted to the transmission of the periodic sidelink data, and they may also be used for transmitting aperiodic sidelink data.

For a Resource Acquisition Manner in NR V2X Mode-2

In the NR-V2X, some new characteristics are introduced, such as, supporting a large number of aperiodic services, increasing a number of times of the retransmission and a more flexible resource reservation period etc. All these characteristics have great influence on the mode of a terminal independently selecting resources. Therefore, based on the Mode 4 in the LTE-V2X, a resource selection scheme, represented as mod-2, is re-designed to be suitable for the NR-V2X. In the mod-2, UE selects, from the resource pool, resources that are not reserved for other UEs or that are reserved for other UEs but have a lower reception power by means of decoding Sidelink Control Information (SCI) sent by other UEs and by means of measuring the reception power of the sidelink. The resource selection for the NR-V2X mod-2 mainly includes the following two operations: the UE determines a candidate resource set, and then selects transmission resources from the candidate resource set.

For PUCCH Report of Sidelink Feedback

According to a physical sidelink shared channel (PSSCH), a sidelink sending terminal needs to transmit sidelink feedback information contained in a physical sidelink feedback channel (PSFCH) corresponding to the PSSCH, and determines to report HARQ feedback information corresponding to the PSSCH to the network. In different propagation modes, the sidelink HARQ information reported by the sending terminal to the network is different. The specific rules include following three cases.

(1) If transmission of PSSCH is in the unicast mode, HARO information for the PSSCH reported to the network is the same as the ACK/NACK information for the PSSCH fed back by the receiving terminal that was detected by the sending terminal. If the sending terminal hasn't detected the PSFCH associated with the PSSCH, the sending terminal reports NACK to the network for the PSSCH.

(2) If transmission of PSSCH is in the multicast mode and the receiving terminal corresponding to the PSSCH needs to feed back ACK or NACK information to the sending terminal, and in this case, if at least one of multiple receiving terminals corresponding to the PSSCH feeds back the ACK information and the ACK information is successfully detected by the sending terminal, the sending terminal reports the ACK to the network for the PSSCH, otherwise the sending terminal reports the NACK.

(3) If transmission of PSSCH is in the multicast mode and the receiving terminal corresponding to the PSSCH only needs to feed back NACK information to the sending terminal, and in this case, if the sending terminal detects that no information is sent on the PSFCH associated with the PSSCH, then the sending terminal reports ACK to the network for the PSSCH, otherwise the sending terminal reports NACK.

In addition to the above rules, if, due to the transmission prioritizations, the sending terminal hasn't any one PSFCH corresponding to the PSSCH or does not send the corresponding PSSCH according to the resources allocated by the network, then NACK is reported to the network for the PSSCH. In the allocation mode based on configuration grant, if the terminal does not transmit the Physical Sidelink Control Channel (PSCCH) associated with the PSSCH within a configured grant period, ACK is reported to the network for the PSSCH.

For the Logical Channel Prioritization (LCP) Criterion

Sidelink LCP processing means processes of prioritizing different logical channels, determining the amount of data to be transmitted for different logical channels, and determining the transmissions for different Media Access Control Control Elements (MAC CEs) when one new MAC Protocol Data Unit (PDU) is generated. Specifically, for the NR-V2X:

if the current resource grant is the configured resource grant of Type 1, the data carried by the logical channels is allowed to be carried by the configured resource grant of Type 1; and according to a configured resource grant list associated with the logical channels, the data carried by the logical channels is allowed to be carried by the currently configured resource grant.

Then, in the set of logical channels that meet conditions, it is necessary to further select the logical channels that need to carry, and finally determine the amount of data that each logical channel may carry. Specifically, following two operations may be included.

In operation 1, a destination address is selected. A logic channel with the associated highest prioritization in the current optional logic channels is included in the sidelink logic channels that have the data to be sent and to which the destination address belongs.

In operation 2, a logical channel is selected inside the selected destination address. Resources are allocated to a sidelink logical channel with the highest prioritization in logical channels satisfying the above-mentioned restriction conditions and belonging to the selected destination address.

For the DRX Mechanism

According to the DRX mechanism, the terminal may discontinuously monitor the Physical Downlink Control Channel (PDCCH) according to the DRX configuration, so as to reduce energy consumption. If the PDCCH includes identification information corresponding to UE, such as any one of the followings: cell radio network temporary identifier (C-RNTI), configured scheduling RNTI (CS-RNTI), interruption RNTI (INT-RNTI), slot format indication RNTI (SFI-RNTI), semi-persistent CSI RNTI (SP-CSI-RNTI), transmit power control-PUCCH-RNTI (TPC-PUCCH- RNTI), transmit power control-PUSCH-RNTI (TPC-PUSCH-RNTI), transmit power control-sounding reference signal-RNTI (TPC-SRS-RNTI), then the UE may perform corresponding DRX operations according to the control information. The network side may control the DRX behaviors of the UE by configuring a series of parameters.

The UE may be in a DRX active state under at least one of the following five cases.

The timer drx-onDurationTimer or drx-InactivityTimer is running

The timer drx-RetransmissionTimerDL or drx-RetransmissionTimerUL is running.

The timer ra-ContentionResolutionTimer or the window msgB-ResponseWindow is running There is an unprocessed Scheduling Request (SR).

The PDCCH indicates that there is a new transmission duration.

In the process of introducing the DRX mechanism into the sidelink communication, it is necessary to ensure that the sending UE sends data to the receiving UE corresponding to the destination address when the receiving UE is in the DRX active state (otherwise, the sending UE will not send data to the receiving UE). By enhancing the LCP process, it may be ensured that the receiving UE is in the DRX active state at the time-domain position corresponding to the sidelink resources to a certain extent. However, the LCP process is only adapted to newly transmitted data, so the relevant rules for retransmission of data still need to be studied.

On the other hand, in the transmission mode of mode-1, the UE needs to feed back a sidelink transmission result to the network. There is a case that since the retransmission grant resource scheduled by the network is not within a duration when the receiving UE is in the DRX inactive state, the sending UE does not perform transmission by using the retransmission grant resource. In this case, how to report feedback to the network is also a problem that needs to be further studied and discussed.

For this purpose, the embodiments of the present disclosure provide a method for processing a sidelink retransmission resource, which is applied to a terminal device. With reference to FIG. 4, the method includes operations S101 to S102.

In operation S101, the first terminal device acquires a sidelink retransmission grant resource.

In operation S102, in response to the sidelink retransmission grant resource being within a duration when a second terminal device is in a DRX inactive state, the first terminal device ignores the sidelink retransmission grant resource.

In an embodiment of the present disclosure, the first terminal device includes a sending terminal (sending UE), and the second terminal device includes a receiving terminal (receiving UE). The first terminal device may acquire the sidelink retransmission grant resource, for example, the network device may allocate the sidelink retransmission grant resource to the first terminal device in the mode-1, or the first terminal device may select the sidelink retransmission grant resource from the resource pool in the mode-2. For the acquired sidelink retransmission grant resource, if the sidelink retransmission grant resource is within a duration when the second terminal device is in the DRX inactive state, the first terminal device will ignore the sidelink retransmission grant resource, i.e., the first terminal device will not send retransmission information by using the sidelink retransmission grant resource.

It may be seen that, with the embodiments of the present disclosure, the sending UE may consider the DRX configuration of the receiving UE in the sidelink transmission process. Regardless of the sending UE being in the mode-1 or the mode-2, if the time-domain position of the sidelink retransmission resource obtained by the sending UE corresponds to a DRX dormancy state rather than the DRX active state of the receiving UE, then the sending UE will ignore the retransmission resource. In other words, in the sidelink communication process of the embodiments of the present disclosure, the sending UE only sends the retransmission information to the receiving UE when the receiving UE is in the DRX wake-up state, so as to ensure that the receiving UE is capable of receiving the retransmission information, thereby reducing unnecessary information overhead and improving the overall performance of the system.

In the above description, the DRX inactive state of the UE may also be referred to as the DRX dormancy state of the UE. In the DRX dormancy state, the receiving UE cannot receive the PSCCH data and/or the PSSCH data. The DRX active state of the UE may also be referred to as the DRX wake-up state. In the DRX wake-up state, the receiving UE may receive the PSCCH data and/or the PSSCH data.

In an embodiment of the present disclosure, the sending UE may be in the mode-1 or the mode-2, and the specific implementations of the embodiments of the present disclosure are different in the two transmission modes. The specific implementations are described in detail following. Case 1: The First Terminal Device is in the First Transmission Mode, i.e., Mode-1

According to an embodiment of the present disclosure, optionally, if the first terminal device is in the mode-1, the first terminal device receives a sidelink retransmission grant resource allocated by a network device.

According to the operation S102, in response to the sidelink retransmission grant resource being within the duration when the second terminal device is in the DRX inactive state, the first terminal device ignores the sidelink retransmission grant resource. Thereafter, optionally, the first terminal device may perform at least one of the followings.

(1) The first terminal device sends an ACK to the network device.

(2) The first terminal device sends a NACK to the network device.

(3) The first terminal device does not send a PUCCH to the network device.

For any one case of (1), (2) and (3), optionally, a sidelink PUCCH configuration parameter sl-PUCCH-Config is configured in a Radio Resource Control (RRC) for the first terminal device, which will be briefly described below, respectively, For example, for the case (1), the first terminal device may report ACK to the network through the configured PUCCH, and the ACK information may be carried through Uplink Control Information (UCI). Optionally, after reporting the ACK, the first terminal device may drop retransmission data; and/or clears a buffer corresponding to retransmission data.

For the case (2), the first terminal device may report NACK to the network through the configured PUCCH, and the NACK may be carried through UCI.

For the case (3), the first terminal device may not report PUCCH. Herein, optionally, the sending terminal may not configure the sl-PUCCH-Config parameter in the case (3) and therefore does not need to report the PUCCH.

Furthermore, according to an embodiment of the present disclosure, for the case (2), optionally, the first terminal device may also send cause information corresponding to the NACK to the network device. Optionally, based on the case (2), the cause information corresponding to the NACK may also be carried through UCI and sent to the network device.

According to an embodiment of the present disclosure, optionally, the cause information may be used for indicating at least one of a), b) or c).

a) The first terminal device receives a NACK from the second terminal device.

b) The first terminal device does not send at least one of: a PSCCH or a PSSCH.

c) The first terminal device has sent at least one of a PSCCH or a PSSCH but has not received a PSFCH.

Based on at least one embodiment above, when the sidelink retransmission resource of the first terminal device corresponds to the DRX dormancy state of the second terminal device, the first terminal device may ignore the retransmission resource and may report the ACK or the NACK (and the cause information corresponding to the NACK) to the network device, or the first terminal device may not report.

Figure 5:
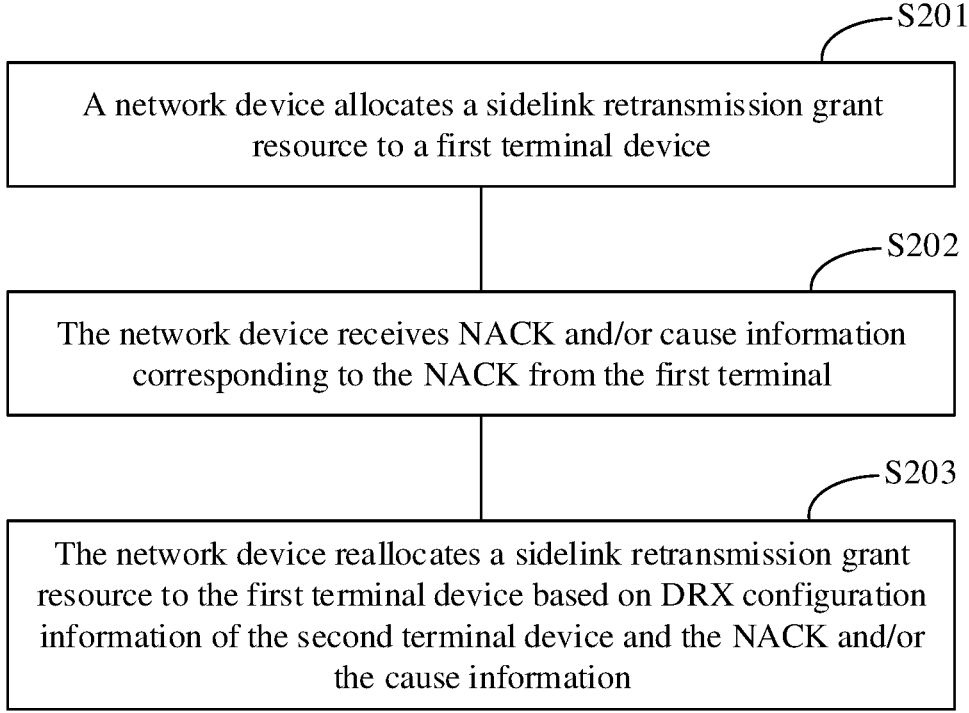
FIG. 5 is a flowchart of a method for processing a sidelink retransmission resource on a network side according to an embodiment of the present disclosure.

Correspondingly, the embodiments of the present disclosure also provide a method for processing a sidelink retransmission resource, which is applied to network device. With reference to FIG. 5, the method includes operations S201 to S203.

In operation S201, the network device allocates a sidelink retransmission grant resource to a first terminal device.

In operation S202, the network device receives at least one of a NACK or cause information corresponding to the NACK from the first terminal device.

In operation S203, the network device reallocates a sidelink retransmission grant resource to the first terminal device based on DRX configuration information of the second terminal device and at least one of the NACK or the cause information.

In an embodiment of the present disclosure, the network device may determine whether to reallocate the retransmission resource to a sending terminal according to the feedback information reported by a sending terminal. If the network device receives the NACK and the cause information, the network device will reallocate the sidelink retransmission grant resource to the sending terminal.

According to an embodiment of the present disclosure, optionally, the cause information may be any one of a), b) or c) described above.

According to an embodiment of the present disclosure, optionally, the network device reallocates the sidelink retransmission grant resource to the first terminal device based on the DRX configuration information of the second terminal device and at least one of the NACK or the cause information by any one of following manners.

In the first manner, the network device schedules a retransmission resource for the first terminal device while a retransmission timer of the second terminal device is running.

In the second manner, the network device schedules a retransmission resource for the first terminal device while an on-duration timer of the second terminal device is running.

In the third manner, the network device schedules a retransmission resource for the first terminal device while an inactivity timer of the second terminal device is running.

In the fourth manner, the network device schedules a retransmission resource for the first terminal device while the second terminal device waits for a Channel State Information (CSI) report after sending a CSI request.

It may be seen that the network device schedules the retransmission resource for the corresponding HARQ process of the sending terminal according to any one of the above manners, which may avoid the retransmission resource falling within the DRX dormancy period of the receiving terminal to a certain extent, so that the sending terminal may perform data retransmission by using the rescheduled retransmission resource.

Case 2: The First Terminal Device is in the Second Transmission Mode, i.e., Mod-2

According to an embodiment of the present disclosure, optionally, if the first terminal device is in the mod-2, the first terminal device selects a sidelink retransmission grant resource from a resource pool.

According to an embodiment of the present disclosure, optionally, the first terminal device selects the sidelink retransmission grant resource from the resource pool by following operations S301 to S302.

In operation S301, the first terminal device selects at least two sidelink retransmission grant resources from the resource pool, a first resource of the at least two sidelink retransmission grant resources is adjacent to a second resource of the at least two sidelink retransmission grant resources (or the first resource and second resource are consecutive resources), where a time gap between the first resource and the second resource is greater than or equal to a first duration, and the time gap between the first resource and the second resource is less than or equal to a second duration.

In operation S302, the first terminal device determines the first resource or the second resource as the sidelink retransmission grant resource.

By selecting the sidelink retransmission grant resource in the above manner, the selected resource is ensured to be within the duration when the receiving terminal is in the DRX active state to the maximum extent by enhancing in the resource selection stage, so that the sending terminal is prevented from being unable to transmit data to the receiving terminal because the receiving terminal is in the DRX dormancy state.

The first duration may be set according to at least one of following 1) to 3).

1) The first duration is determined according to the DRX configuration of the second terminal device.

2) The first duration is greater than or equal to a Round Trip Time (RTT).

3) The first duration is at least one of: a fixed value, a value configured by the network device, a value defined in a protocol, or a pre-configured value.

The second duration may be set according to at least one of following 1) to 3).

1) The second duration is determined according to the DRX configuration of the second terminal device.

2) The second duration is less than or equal to a retransmission duration.

3) The second duration is at least one of: a fixed value, a value configured by the network device, a value defined in a protocol, or a pre-configured value.

According to an embodiment of the present disclosure, optionally, after the first terminal device ignores the sidelink retransmission grant resource, the first terminal device reselects a sidelink retransmission grant resource according to the DRX configuration of the second terminal device. The re-selected sidelink retransmission grant resource is within the duration when the second terminal device is in the DRX inactive state.

According to an embodiment of the present disclosure, optionally, the first terminal device sends retransmission data by using the re-selected sidelink retransmission grant resource.

According to an embodiment of the present disclosure, optionally, after the first terminal device ignores the sidelink retransmission grant resource, the first terminal device drops the retransmission data and/or clears a buffer corresponding to retransmission data.

The embodiments of the present disclosure provide a solution for a case that the retransmission resource provided by the network or selected by the sending UE is within the duration when the receiving UE is in the DRX inactive state in the sidelink transmission mode of the mode-1 and mode-2. According to at least one of the above embodiments of the present disclosure, in the sidelink communication process, regardless of the sending UE being in the mode-1 or the mode-2, when the receiving UE is in DRX dormancy state, the sending UE will not send retransmission data to the receiving UE. By reallocating the retransmission resource by the network or re-selecting the retransmission resource by the sending UE, it may be ensured that the sending UE sends retransmission information to the receiving UE in the duration when the receiving UE is in the DRX wake-up state. By the embodiments of the present disclosure, unnecessary information overhead can be reduced and the overall performance of the system can be improved.

The implementations of the methods for processing the sidelink retransmission resource of the embodiments of the present disclosure are described by the embodiments above, and the specific implementations of the embodiments of the present disclosure will be described by multiple specific examples below.

Example 1: The Sending UE Adopts the Mode-1

In this example, the sending UE adopts the mode-1, and the time-domain position of the retransmission resource allocated by the network device to the sending UE is within a duration when the receiving terminal device is in the DRX inactive state.

The interaction processes between the terminal side and the network side under several different implementations are described exemplarily below.

In the first manner, the terminal ignores the sidelink retransmission grant resource, and reports ACK to the network.

Figure 6:
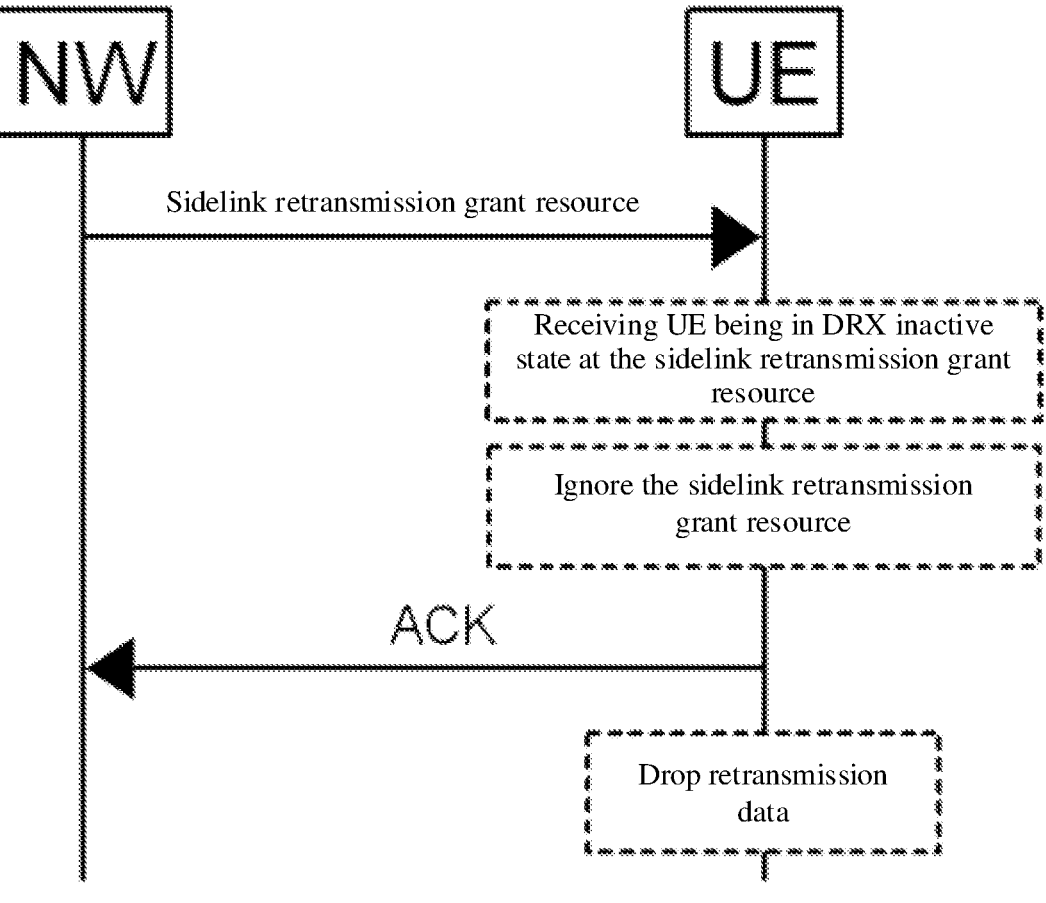
FIG. 6 is an interactive flowchart of a method for processing a sidelink retransmission resource according to an embodiment of the present disclosure.

With reference to FIG. 6, a network device NW provides a sidelink retransmission grant resource for a sending UE, and the sidelink retransmission grant resource is used for an HARQ process 1.

The sending UE determines that a receiving UE corresponding to the HARQ process 1 is in DRX inactive state at a time-domain position of the sidelink retransmission grant resource, the sending UE ignores the sidelink retransmission grant resource, and reports ACK to the network (where the sending UE is configured with PUCCH).

After receiving the ACK fed back by the sending UE, the network device no longer schedules retransmission resources for the HARQ process 1 corresponding to the sending UE.

The sending UE drops the corresponding retransmission data and clears the corresponding data buffer.

In the second manner. the terminal ignores the sidelink retransmission grant resource and reports the NACK to the network.

Figure 7:
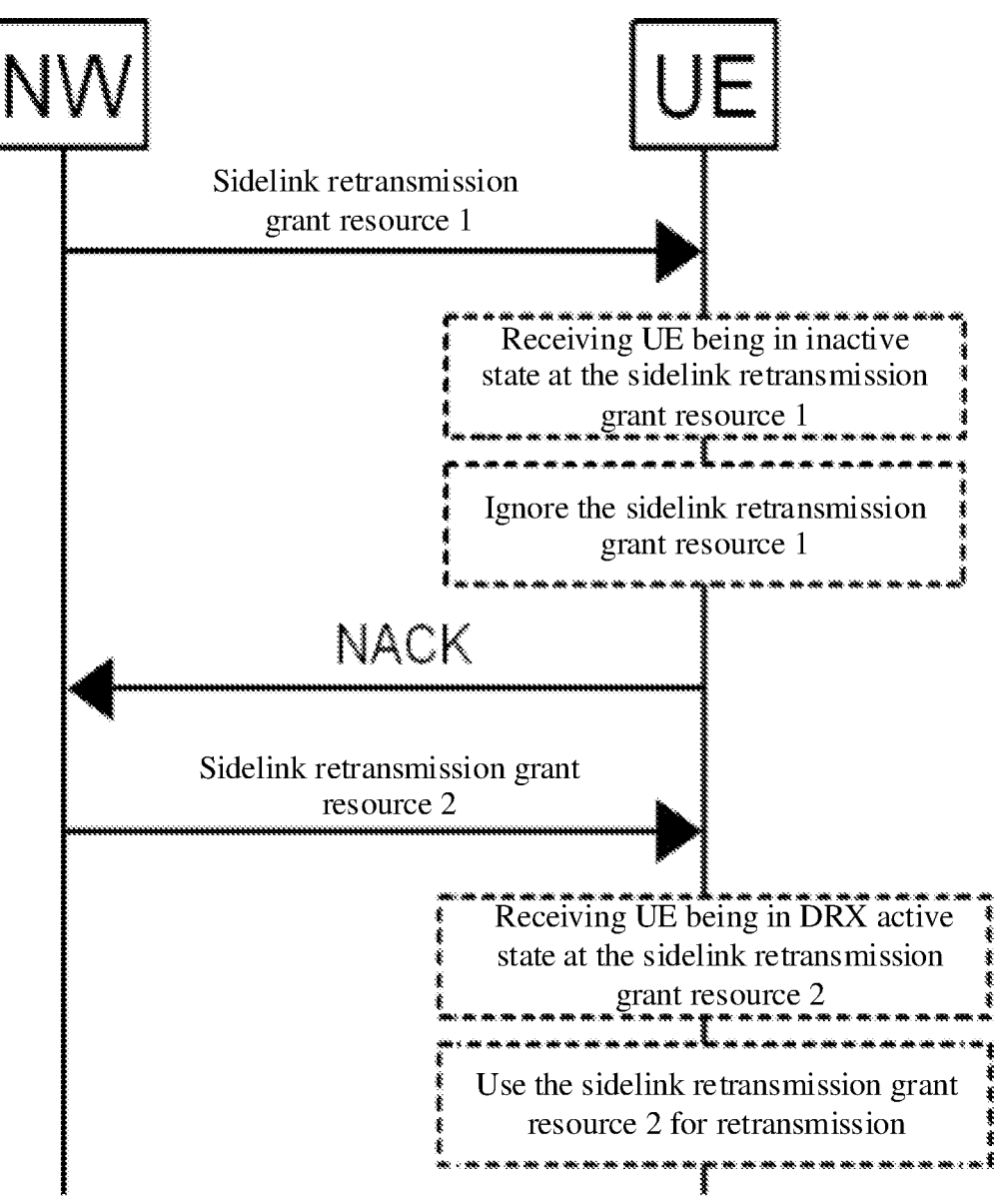
FIG. 7 is an interactive flowchart of a method for processing a sidelink retransmission resource according to an embodiment of the present disclosure.

With reference to FIG. 7, the network device NW provides a sidelink retransmission grant resource for the sending UE, and the sidelink retransmission grant resource is used for an HARQ process 1.

The sending UE determines that the receiving UE corresponding to the HARQ process 1 is in the DRX inactive state at the time-domain position of the sidelink retransmission grant resource, and the sending UE ignores the sidelink retransmission grant resource and reports the NACK to the network (where the sending UE is configured with PUCCH). UCI information also includes information (such as 2 bits) indicating specific causes for reporting the NACK to the network, and the causes include at least one of followings.

The sending UE receives the NACK feedback from the receiving UE on the PSFCH.

The sending UE does not send PSCCH or PSSCH (e.g., since the receiving UE is in the DRX inactive state or due to the prioritization);

The sending UE has sent at least one of the PSCCH or the PSSCH but has not received the PSFCH (e.g., due to HARQ disable or PSFCH drop).

If the network device receives the NACK fed back by the sending UE, the network device may schedule a retransmission resource 2 for the receiving UE according to the DRX configuration information of the receiving UE;

If the network device receives the cause information associated with the NACK fed back by the sending UE, the network device may schedule the retransmission resource 2 for the receiving UE according to the cause information and the DRX configuration information of the receiving UE.

If the network device receives the NACK and the cause information associated with the NACK fed back by the sending UE, the network device may schedule the retransmission resource 2 for the receiving UE according to the cause information and the DRX configuration information of the receiving UE.

As an example, the network device may schedule the retransmission resource 2 for the sending UE within a duration when the receiving UE is in the DRX active state. The DRX active state of the receiving UE includes, but is not limited to, at least one of the followings:

while a retransmission timer of the corresponding receiving UE is running;

while an on-duration timer of the corresponding receiving UE is running;

while an inactivity timer of the corresponding receiving UE is running;

while the corresponding receiving UE waits for a CSI report after sending a CSI request.

After receiving the sidelink retransmission grant resource 2, if the sending UE determines that the receiving UE corresponding to the HARQ process 1 is in the DRX active state at the time-domain position of the sidelink retransmission grant resource 2, the sending UE performs the retransmission by using the retransmission resource 2. In this case, the receiving UE is in the DRX active state, and thus may receive the retransmission data.

Figure 8:
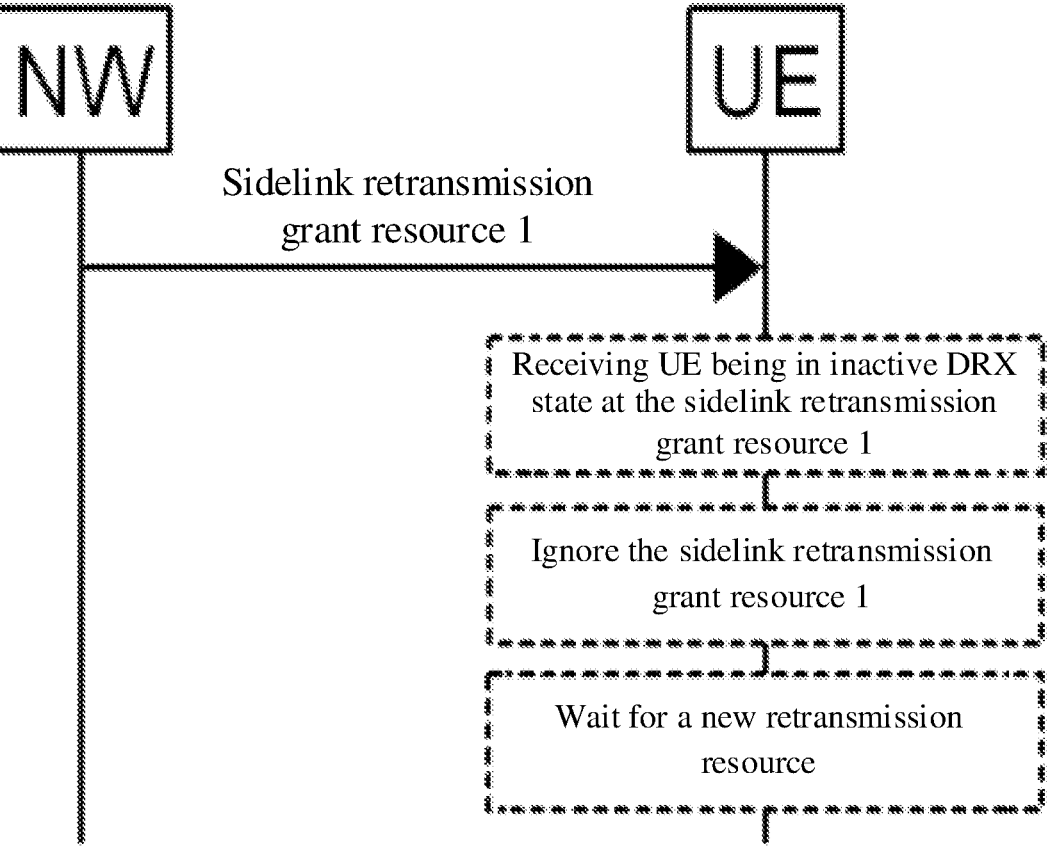
FIG. 8 is an interactive flowchart of a method for processing a sidelink retransmission resource according to an embodiment of the present disclosure.

In the third manner, the terminal ignores the sidelink retransmission grant resource and does not report PUCCH to the network With reference to FIG. 8, the network device NW provides a sidelink retransmission grant resource for the sending UE and the sidelink retransmission grant resource is used for an HARQ process 1.

The sending UE determines that a receiving UE corresponding to the HARQ process 1 is in the DRX inactive state at a time-domain position of the sidelink retransmission grant resource, the sending UE ignores the sidelink retransmission grant resource, and does not report the PUCCH to the network (where the sending UE may or may not be configured with the PUCCH).

The network device has not received the PUCCH fed back by the UE, and re-schedules a retransmission resource 2 for the UE.

The sending UE waits for a new retransmission resource, and after receiving the retransmission resource 2, the sending UE determines whether the retransmission resource 2 is available again. If the retransmission resource 2 is not available (i.e. the receiving UE is in the DRX inactive state at the time-domain position of the sidelink retransmission grant resource 2), the sending UE may continue processing by adopting any one of the above provided first manner (i.e., reporting ACK), second manner (i.e., reporting NACK) or third manner (not reporting PUCCH), the specific procedures of which are as described above and will not be described again herein.

Example 2: The Sending UE Adopts the Mode-2

In this example, the sending UE adopts the mode-2, and the time-domain position of the resource selected by the sending UE is within a duration when the receiving UE is in the inactive state.

The procedures that the terminal side processes resources within the duration when the receiving UE is in the inactive state under several different implementations are described exemplarily below.

In the first manner, the terminal ignores the sidelink retransmission grant resource and reselects a resource according to a DRX configuration of the receiving UE.

Figure 9:
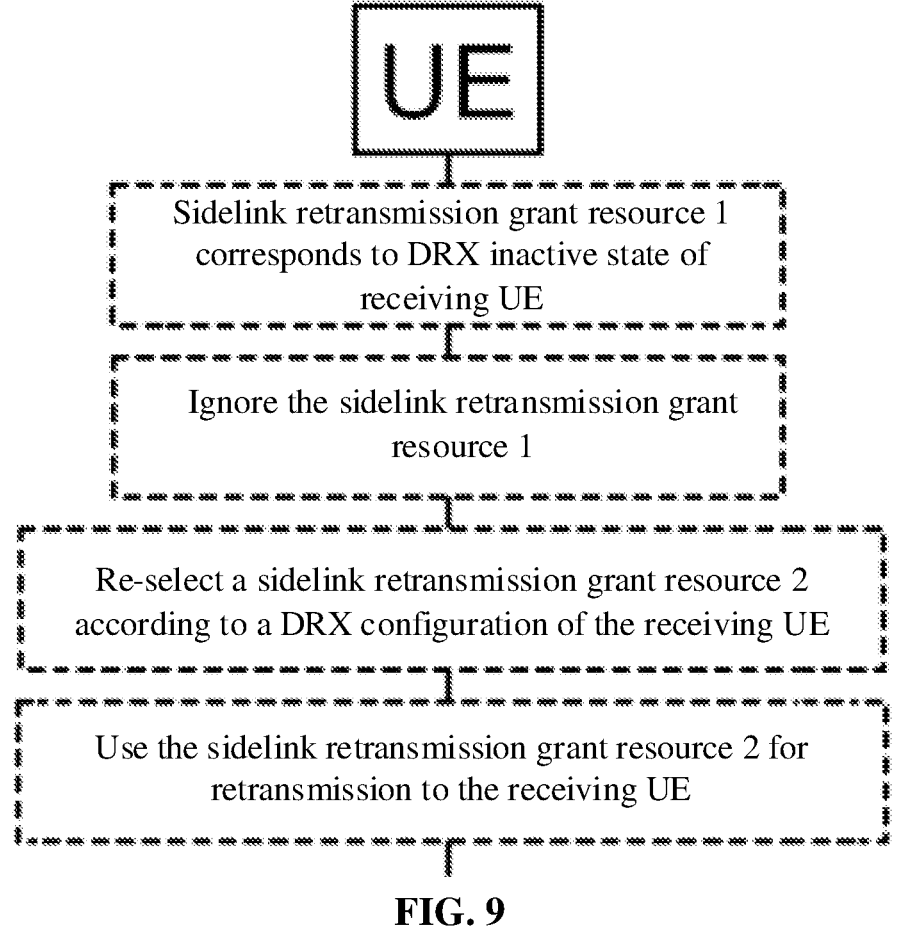
FIG. 9 is an interactive flowchart of a method for processing a sidelink retransmission resource according to an embodiment of the present disclosure.

With reference to FIG. 9, the sending UE determines that the receiving UE corresponding to the HARQ process 1 is in the DRX inactive state at a time-domain position of the selected sidelink retransmission grant resource, so the sending UE ignores the sidelink retransmission grant resource.

The sending UE re-selects a retransmission resource 2 based on the DRX configuration of the corresponding receiving UE, and the retransmission resource 2 is within the duration when the receiving UE is in the DRX active state.

The sending UE sends retransmission data to the receiving UE by using the retransmission resource 2.

In the second manner, the terminal ignores the sidelink retransmission grant resource and drops the retransmission data corresponding to the sidelink retransmission grant resource.

Figure 10:
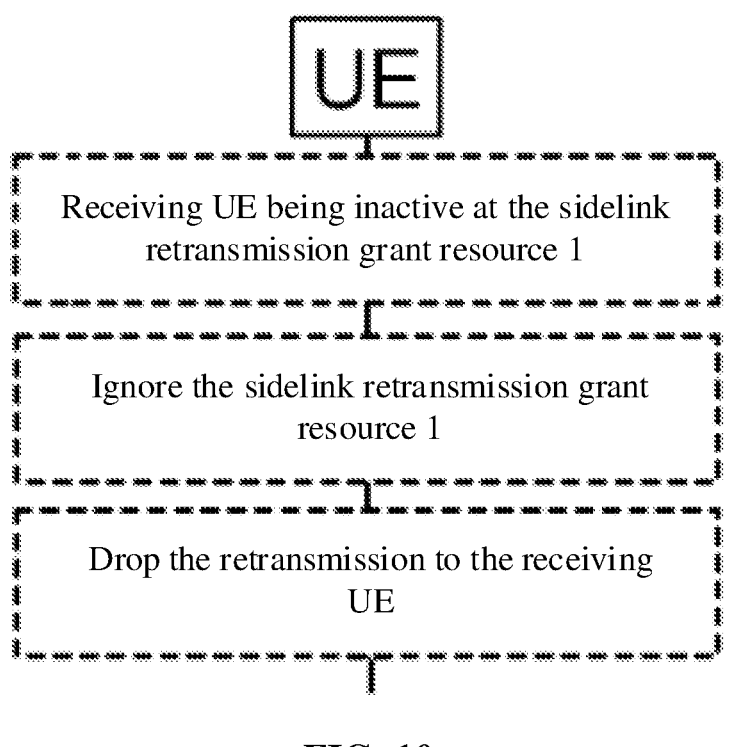
FIG. 10 is an interactive flowchart of a method for processing a sidelink retransmission resource according to an embodiment of the present disclosure.

With reference to FIG. 10, the sending UE determines that the receiving UE corresponding to the HARQ process 1 is in the DRX inactive state at a time-domain position of the selected sidelink retransmission grant resource, so the sending UE ignores the sidelink retransmission grant resource, drops the corresponding retransmission data, and/or clears the buffer corresponding to the retransmission data.

In the third manner, the terminal performs enhancement in the resource selection stage. If the selected resource subjected to the enhancement is still unavailable, the sidelink retransmission grant resource is ignored, and the resource re-selection may be performed or corresponding retransmission data may be dropped.

Exemplarily, the enhancement in the resource selection stage may be performed in a manner of setting a threshold of the time gap between any two selected adjacent transmission resources. For example, a minimum time gap and a maximum time gap may be set, resources for which a time gap therebetween meets the threshold may be selected, and resources for which a time gap therebetween does not meet the threshold may be excluded. By setting an appropriate threshold, the probability that the selected retransmission resources meet the requirements can be improved.

Based on this, in one embodiment of the present disclosure, following processes may be performed.

Figure 11:
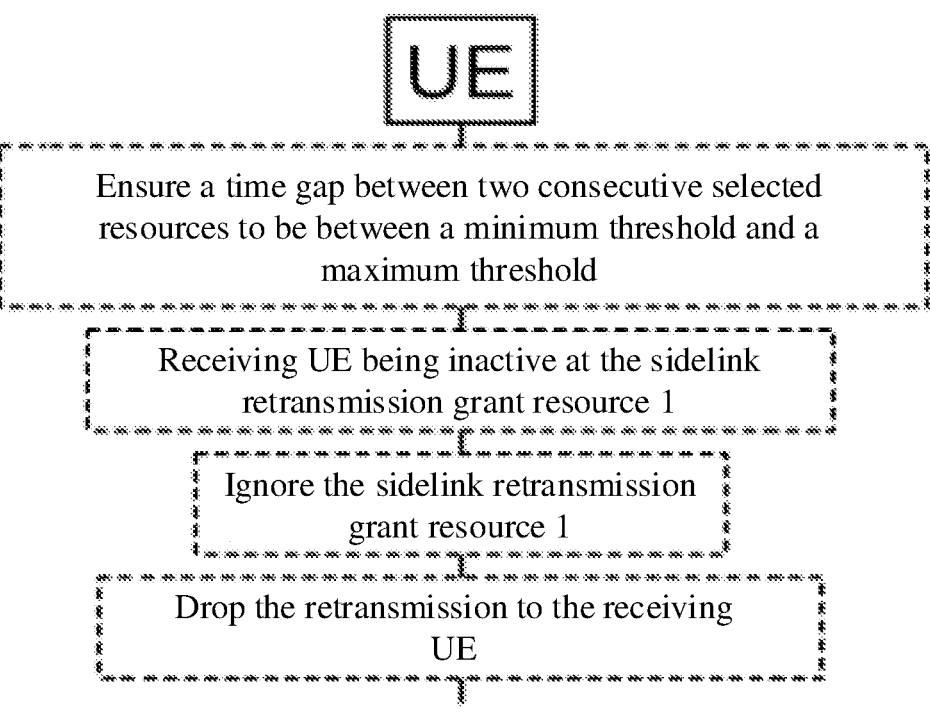
FIG. 11 is an interactive flowchart of a method for processing a sidelink retransmission resource according to an embodiment of the present disclosure.

With reference to FIG. 11, in the resource selection, the sending UE may select one or more transmission resources among available resources, and it is necessary to ensure that the minimum time gap between any two consecutive resources is not less than a preset duration 1, and the maximum time gap between the two consecutive resources is not greater than a preset duration 2.

A For the Duration 1 a) The duration 1 may be determined according to the DRX configuration of the receiving UE. For example, the duration $1 \geq$ RTT timer.

b) The duration 1 may also be at least one of the followings: a fixed value, a value configured by the network device, a value defined in a protocol, or a pre-configured value.

B For the Duration 2 a) The duration 2 may be determined according to the DRX configuration of the receiving UE. For example, the duration $2 \leq$ retransmission timer;

b) The duration 2 may also be at least one of followings: a fixed value, a value configured by the network device, a value defined in a protocol, or a pre-configured value.

According to the above principles, after selecting the one or more sidelink transmission resources, the sending UE may determine whether the receiving UE corresponding to the HARQ process 1 is in the DRX inactive state of the receiving UE at the time-domain position of the sidelink retransmission grant resource.

If the time-domain position is within the duration when the receiving UE is in the DRX active state, the sending UE retransmits data by using the sidelink retransmission grant resource.

Conversely, if the time-domain position is within the duration when the receiving UE is in the DRX inactive state, the sending UE ignores the sidelink retransmission grant resource. After that, the sending UE may continue processing through the first manner or second manner.

For example, for the first manner, the sending UE may re-select a retransmission resource 2 based on the DRX configuration of the receiving UE. If the retransmission resource 2 is within the duration when the receiving UE is in the DRX active state, the sending UE sends retransmission data to the receiving UE by using the retransmission resource 2.

Optionally, for the second manner, the sending UE may drop the retransmission data and/or clear the buffer corresponding to the retransmission data.

According to at least one of the above embodiments of the present disclosure, in the sidelink transmission mode of the mode-1 or the mode-2, if the retransmission resource provided by the network or selected by the UE is within the duration when the receiving UE is in the DRX inactive state, the UE in the mode-1 may adopt the strategy of reporting PUCCH, and the UE in the mode-2 may adopt the strategy of enhancing the resource selection. In this way, the sending UE will not send retransmission information when the receiving UE is in the DRX inactive state during the sidelink transmission process, thus reducing unnecessary information overhead and improving the overall performance of the system.

Figure 12:
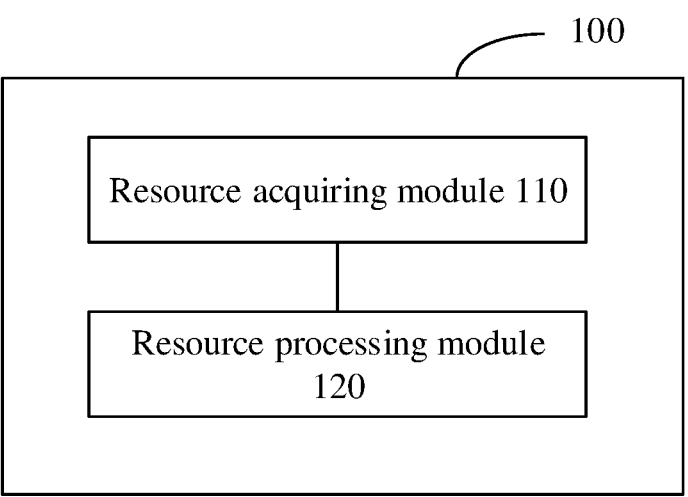
FIG. 12 is a schematic structural block diagram of a terminal device according to an embodiment of the present disclosure.

The specific arrangements and implementations of the embodiments of the present disclosure are described above from different perspectives through multiple embodiments. Corresponding to the processing method of at least one embodiment described above, the embodiments of the present disclosure also provide a terminal device 100. With reference to FIG. 12, the terminal device 100 includes a resource acquiring module 110 and a resource processing module 120.

The resource acquiring module 110 is configured to acquire a sidelink retransmission grant resource.

The resource processing module 120 is configured to ignore the sidelink retransmission grant resource in response to the sidelink retransmission grant resource being within a duration when a receiving terminal device is in a DRX inactive state.

Optionally, the terminal device is in a first transmission mode, and the resource acquiring module is configured to receive the sidelink retransmission grant resource allocated by a network device.

Optionally, the terminal device 100 further includes a first sending module configured to send a positive ACK to the network device.

Optionally, the terminal device 100 further includes a data processing module configured to drop retransmission data; and/or clear a buffer corresponding to retransmission data.

Optionally, the terminal device 100 further includes a second sending module configured to send a NACK to the network device.

Optionally, the terminal device 100 further includes a third sending module configured to send cause information corresponding to the NACK to the network device.

Optionally, the cause information is used for indicating at least one of the followings that:

the first terminal device receives a NACK from the receiving terminal device;

the first terminal device does not send at least one of: a PSCCH or a PSSCH; or the first terminal device has sent at least one of a PSCCH or a PSSCH but has not received a PSFCH.

Optionally, the terminal device does not send a PUCCH to the network device.

Optionally, sl-PUCCH-Config is configured in a RRC for the terminal device.

Optionally, the terminal device is in a second transmission mode, and the resource acquiring module is configured to select the sidelink retransmission grant resource from a resource pool.

Optionally, the resource acquiring module 110 includes a selecting sub-module and a determining sub-module.

The selecting sub-module is configured to select at least two sidelink retransmission grant resources from the resource pool. A first resource of the at least two sidelink retransmission grant resources is adjacent to a second resource of the at least two sidelink retransmission grant resources. A time gap between the first resource and the second resource is greater than or equal to a first duration, and the time gap between the first resource and the second resource is less than or equal to a second duration.

The determining sub-module is configured to determine the first resource or the second resource as the sidelink retransmission grant resource.

Optionally, the first duration is determined according to a DRX configuration of the receiving terminal device.

Optionally, the first duration is greater than or equal to RTT.

Optionally, the first duration is at least one of: a fixed value, a value configured by the network device, a value defined in a protocol, or a pre-configured value.

Optionally, the second duration is determined according to a DRX configuration of the receiving terminal device.

Optionally, the second duration is less than or equal to a retransmission duration.

Optionally, the second duration is at least one of: a fixed value, a value configured by the network device, a value defined in a protocol, or a pre-configured value.

Optionally, the terminal device 100 further includes a re-selecting module configured to re-select a sidelink retransmission grant resource according to the DRX configuration of the receiving terminal device after the resource processing module ignores the sidelink retransmission grant resource, where the re-selected sidelink retransmission grant resource is within the duration when the receiving terminal device is in the DRX inactive state.

Optionally, the terminal device 100 further includes a fourth sending module configured to send retransmission data by using the re-selected sidelink retransmission grant resource.

Optionally, the terminal device 100 further includes a data processing module configured to drop retransmission data and/or clear a buffer corresponding to retransmission data after the resource processing module ignores the sidelink retransmission grant resource.

Figure 13:
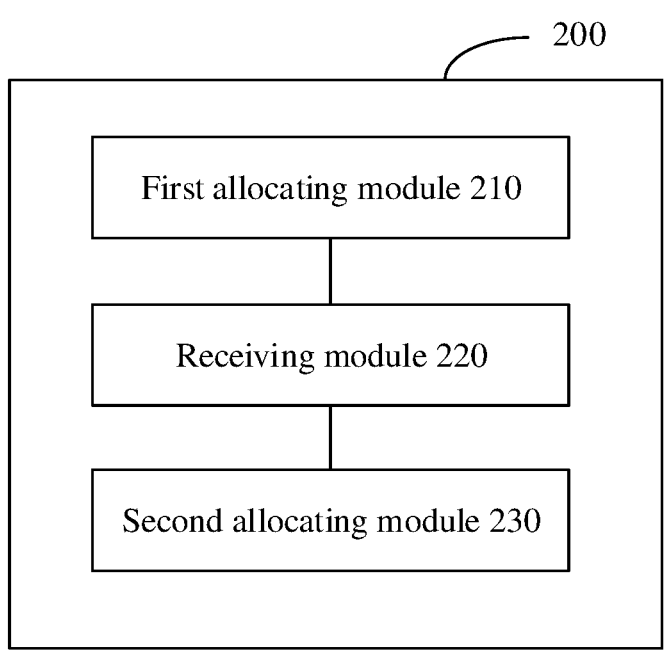
FIG. 13 is a schematic structural block diagram of a network device according to an embodiment of the present disclosure.

Corresponding to the processing method of at least one embodiment described above, the embodiments of the present disclosure also provide a network device 200. With reference to FIG. 13, the network device 200 includes a first allocating module 210, a receiving module 220 and a second allocating module 230.

The first allocating module 210 is configured to allocate a sidelink retransmission grant resource to a first terminal device.

The receiving module 220 is configured to receive at least one of a NACK or cause information corresponding to the NACK from the first terminal device.

The second allocating module 230 is configured to reallocate a sidelink retransmission grant resource to the first terminal device based on DRX configuration information of the second terminal device and at least one of the NACK or the cause information.

Optionally, the cause information is used for indicating at least one of the followings that:

the first terminal device receives a NACK from the second terminal device;

the first terminal device does not send the PSCCH or the PSSCH; or the first terminal device has sent at least one of a PSCCH or a PSSCH but has not received a PSFCH.

Optionally, the second allocating module 230 includes at least one of: a first scheduling sub-module, a second scheduling sub-module, a third scheduling sub-module or a fourth scheduling sub-module.

The first scheduling sub-module is configured to schedule a retransmission resource for the first terminal device while a retransmission timer of the second terminal device is running.

The second scheduling sub-module is configured to schedule a retransmission resource for the first terminal device while an on-duration timer of the second terminal device is running.

The third scheduling sub-module is configured to schedule a retransmission resource for the first terminal device during operation of an inactivity timer of the second terminal device is running.

The fourth scheduling sub-module is configured to schedule a retransmission resource for the first terminal device while the second terminal device waits for a CSI report after sending a CSI request.

The terminal device 100 and the network device 200 in the embodiments of the present disclosure may implement the corresponding functions of the devices in the aforementioned method embodiments. The flow, function, implementation and beneficial effects corresponding to each module (sub-module, unit or component, etc.) in the terminal device 100 and the network device 200 may be referred to the corresponding description in the above method embodiments, and will not be described repeatedly herein.

It should be noted that, the functions described with respect to modules (sub-modules, units or components, etc.) in the terminal device 100 and the network device 200 in the embodiments of the present disclosure may be implemented by different modules (sub-modules, units or components, etc.) or by the same module (sub-module, unit or component, etc.). For example, the first sending module and the second sending module may be different modules or the same module, which all may implement the corresponding functions of the terminal device and the network device according to the embodiments of the present disclosure. In addition, the sending module and the receiving module in the embodiments of the present disclosure may be implemented by a transceiver of the device, and some or all of the remaining modules may be implemented by a processor of the device.

Figure 14:
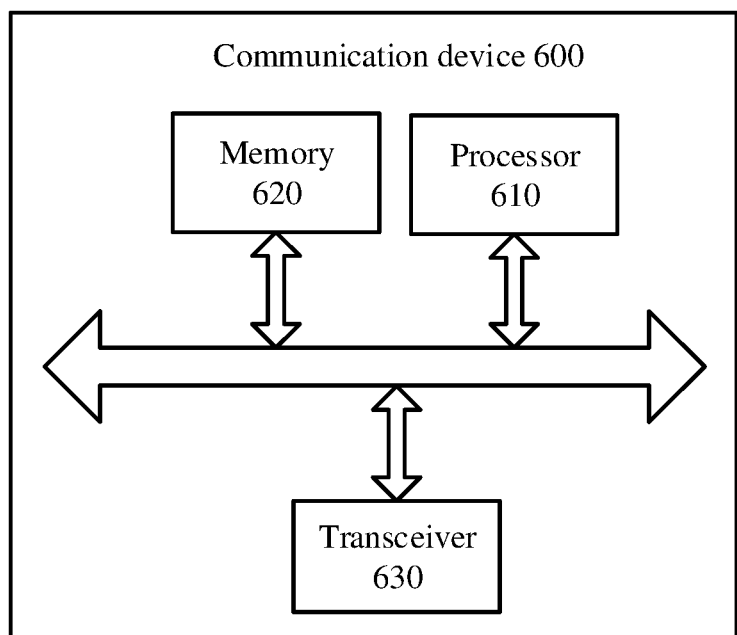
FIG. 14 is a schematic block diagram of a communication device according to an embodiment of the present disclosure.

FIG. 14 is a schematic structural diagram of a communication device 600 according to an embodiment of the present disclosure. The communication device 600 includes a processor 610. The processor 610 may invoke and run a computer program from a memory to implement the methods in the embodiments of the present disclosure.

Optionally, the communication device 600 may also include a memory 620. The processor 610 may invoke and run a computer program from the memory 620 to implement the methods in the embodiments of the present disclosure.

The memory 620 may be a separate device independent of the processor 610 or may be integrated in the processor 610.

Optionally, the communication device 600 may also include a transceiver 630. The processor 610 may control the transceiver 630 to communicate with other devices and specifically to send information or data to other devices or receive information or data from other devices.

The transceiver 630 may include a transmitter and a receiver. The transceiver 630 may further include an antenna(s), and the number of the antenna(s) may be one or more.

Optionally, the communication device 600 may be a network device in the embodiments of the present disclosure, and the communication device 600 may implement corresponding flows implemented by the network device in each method of the embodiments of the present disclosure, which will not be elaborated herein for brevity.

Optionally, the communication device 600 may be the terminal device in the embodiments of the present disclosure, and the communication device 600 may implement corresponding flows implemented by the terminal device in each method of the embodiments of the present disclosure, which will not be elaborated herein for brevity.

Figure 15:
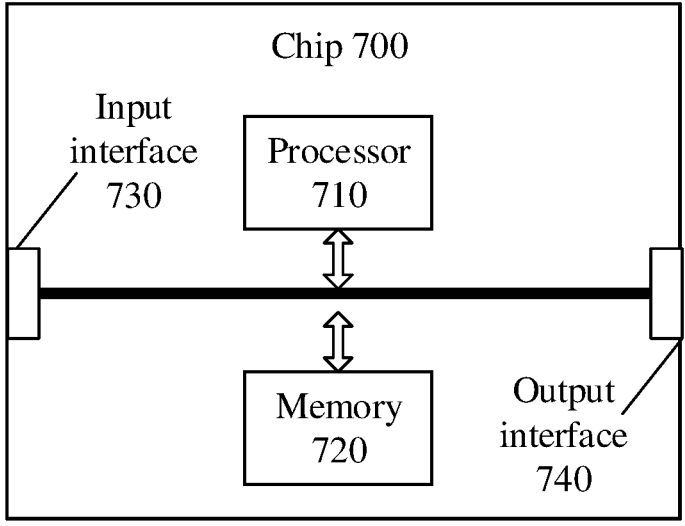
FIG. 15 is a schematic block diagram of a chip according to an embodiment of the present disclosure.

FIG. 15 is a schematic structural diagram of a chip 700 according to an embodiment of the present disclosure. The chip 700 includes a processor 710 that may call and run a computer program from a memory to implement the methods in the embodiments of the present disclosure, and the processor 710 may include at least one processor circuit.

Optionally, the chip 700 may also include a memory 720. The processor 710 may invoke and run a computer program from the memory 720 to implement the methods in the embodiments of the present disclosure.

The memory 720 may be a separate device independent of or may be integrated into the processor 710.

Optionally, the chip 700 may also include an input interface 730. The processor 710 may control the input interface 730 to communicate with other devices or chips, and specifically to acquire information or data sent by other devices or chips.

Optionally, the chip 700 may also include an output interface 740. The processor 710 may control the output interface 740 to communicate with other devices or chips, and specifically to output information or data to other devices or chips.

Optionally, the chip may be applied to the network device in the embodiments of the present disclosure, and the chip may implement corresponding flows implemented by the network device in each method of the embodiments of the present disclosure, which will not be elaborated herein for brevity.

Optionally, the chip may be applied to the terminal device in the embodiments of the present disclosure, and the chip may implement corresponding flows implemented by the terminal device in each method of the embodiments of the present disclosure, which will not be elaborated herein for brevity.

It is to be understood that the chips mentioned in the embodiments of the present disclosure may also be referred to as system level chips, system chips, chip systems or on-chip system chips, etc.

The above processors may be general purpose processors, Digital Signal Processors (DSPSs), Field Programmable Gate Arrays (FPGAs), Application Specific Integrated Circuits (ASICs) or other programmable logic devices, transistor logic devices, and discrete hardware components. The general-purpose processor may be a microprocessor or any conventional processor or the like.

The memory mentioned above may be a volatile memory or a non-volatile memory or may include both the volatile memory and the non-volatile memory. The non-volatile memory may be Read-only Memory (ROM), Programmable ROM (PROM), Erasable programmable ROM (EPROM), Electrically EPROM (EEPROM) or flash memory. The volatile memory may be a Random Access Memory (RAM).

It is to be understood that the above memory is exemplary but not restrictive. For example, the memory in the embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM), Direct Rambus RAM (DR RAM), etc. That is to say, the memory in the embodiments of the present disclosure is intended to include, but is not limited to, these and any other suitable types of memory.

Figure 16:
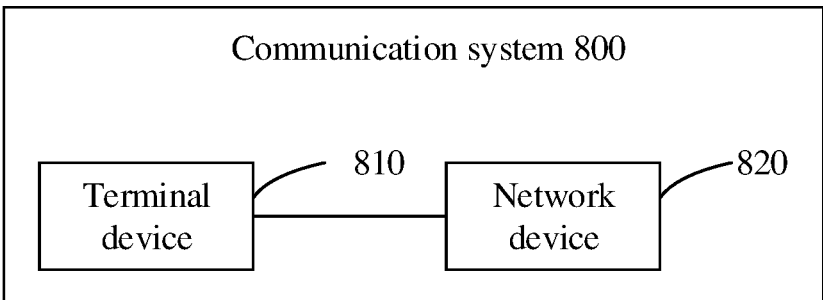
FIG. 16 is a schematic block diagram of a communication system according to an embodiment of the present disclosure.

FIG. 16 is a schematic block diagram of a communication system 800 according to an embodiment of the present disclosure. The communication system 800 includes a terminal device 810 and a network device 820.

The terminal device 810 may be configured to implement corresponding functions implemented by the terminal device in each method of the embodiments of the present disclosure, and the network device 820 may be configured to implement corresponding functions implemented by the network device in each method of the embodiments of the present disclosure, which will not be elaborated herein for brevity.

The foregoing embodiments may be implemented in whole or in part by software, hardware, firmware, or any combination thereof. When implemented by software, it may be implemented in whole or in part in the form of a computer program product. The computer program product includes one or more computer instructions. When the computer program instructions are loaded and executed by a computer, all or part of the processes or functions according to the embodiments of the present disclosure are generated. The computer may be a general-purpose computer, a special-purpose computer, a computer network, or other programmable devices. The computer instructions may be stored in a computer-readable storage medium or transmitted from a computer-readable storage medium to another computer-readable storage medium. For example, the computer instructions may be transmitted from a website site, computer, server, or data center to another website site, computer, server, or data center in a wired (such as a coaxial cable, an optical fiber, and a Digital Subscriber Line (DSL)) or wireless (such as infrared, wireless, and microwave) manner. The computer-readable storage medium may be any available medium that may be accessed by a computer or a data storage device such as a server including one or more available medium integrations and a data center. The available medium may be a magnetic medium (such as a floppy disk, a hard disk, and a magnetic tape), an optical medium (such as a Digital Versatile Disc (DVD)), a semiconductor medium (such as a Solid State Disk (SSD)), or the like.

It should be understood that, in various embodiments of the present disclosure, a magnitude of a sequence number of each process does not mean an execution sequence and the execution sequence of each process should be determined by its function and an internal logic and should not constitute any limit to an implementation process of the embodiments of the present disclosure.

Those skilled in the art may clearly learn about that specific working processes of the system, device and unit described above may refer to the corresponding processes in the method embodiments and will not be elaborated herein for convenient and brief description.

The above is only the specific implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for processing a sidelink retransmission resource, comprising:
   acquiring, by a first terminal device, a sidelink retransmission grant resource; and
   ignoring, by the first terminal device, the sidelink retransmission grant resource in response to the sidelink retransmission grant resource being within a duration when a second terminal device is in a discontinuous reception (DRX) inactive state.

2. The method of claim 1, wherein the first terminal device is in a first transmission mode, and the acquiring, by the first terminal device, the sidelink retransmission grant resource comprises: receiving, by the first terminal device, the sidelink retransmission grant resource allocated by a network device.

3. The method of claim 2, further comprising:
sending, by the first terminal device, a positive acknowl-edgement (ACK) to the network device.

4. The method of claim 2, further comprising:
sending, by the first terminal device, a negative acknowl-edgement (NACK) to the network device.

5. The method of claim 4, further comprising:
sending, by the first terminal device, cause information corresponding to the NACK to the network device.

6. The method of claim 3, wherein a sidelink PUCCH configuration parameter (sl-PUCCH-Config) is configured in a Radio Resource Control (RRC) for the first terminal device.

7. The method of claim 1, wherein the first terminal device is in a second transmission mode, and the acquiring, by the first terminal device, the sidelink retransmission grant resource comprises: selecting, by the first terminal device, the sidelink retransmission grant resource from a resource pool.

8. The method of claim 7, wherein selecting, by the first terminal device, the sidelink retransmission grant resource from the resource pool comprises:
selecting, by the first terminal device, at least two sidelink retransmission grant resources from the resource pool, a first resource of the at least two sidelink retransmis-sion grant resources being adjacent to a second resource of the at least two sidelink retransmission grant resources, wherein a time gap between the first resource and the second resource is greater than or equal to a first duration, and the time gap between the first resource and the second resource is less than or equal to a second duration; and
determining, by the first terminal device, the first resource or the second resource as the sidelink retransmission grant resource.

9. The method of claim 7, further comprising: after ignoring, by the first terminal device, the sidelink retrans-mission grant resource,
re-selecting, by the first terminal device, a sidelink retransmission grant resource according to the DRX configuration of the second terminal device, wherein the re-selected sidelink retransmission grant resource is within the duration when the second terminal device is in the DRX inactive state.

10. A terminal device, comprising: a processor and a transceiver, wherein the processor is configured to:
acquire a sidelink retransmission grant resource; and
ignore the sidelink retransmission grant resource in response to the sidelink retransmission grant resource being within a duration when a receiving terminal is in a discontinuous reception (DRX) inactive state.

11. The terminal device of claim 10, wherein the terminal device is in a first transmission mode, and the processor is configured to control the transceiver to receive the sidelink retransmission grant resource allocated by a network device.

12. The terminal device of claim 11, wherein the proces-sor is further configured to:
control the transceiver to send a positive acknowledge-ment (ACK) to the network device.

13. The terminal device of claim 11, wherein the proces-sor is further configured to:
control the transceiver to send a negative acknowledge-ment (NACK) to the network device.

14. The terminal device of claim 13, wherein the proces-sor is further configured to:
control the transceiver to send cause information corre-sponding to the NACK to the network device.

15. The terminal device of claim 12, wherein a sidelink PUCCH configuration parameter (sl-PUCCH-Config) is configured in a Radio Resource Control (RRC) for the terminal device.

16. The terminal device of claim 10, wherein the terminal device is in a second transmission mode, and the processor is configured to select the sidelink retransmission grant resource from a resource pool.

17. The terminal device of claim 16, wherein the proces-sor is further configured to:
re-select a sidelink retransmission grant resource accord-ing to the DRX configuration of the receiving terminal after ignoring the sidelink retransmission grant resource, wherein the re-selected sidelink retransmis-sion grant resource is within the duration when the receiving terminal is in the DRX inactive state.

18. A network device, comprising: a processor and a transceiver, wherein the processor is configured to:
allocate a sidelink retransmission grant resource to a first terminal device;
receive at least one of a negative acknowledgement (NACK) or cause information corresponding to the NACK from the first terminal device; and
reallocate a sidelink retransmission grant resource to the first terminal device based on discontinuous reception (DRX) configuration information of a second terminal device and at least one of the NACK or the cause information.

19. The network device of claim 18, wherein the cause information is used for indicating at least one of the follow-ings that:
the first terminal device receives a NACK from the second terminal device;
the first terminal device does not send at least one of: a Physical Sidelink Control Channel (PSCCH) or a Physical Sidelink Shared Channel (PSSCH); or
the first terminal device has sent at least one of a PSCCH or a PSSCH but has not received a Physical Sidelink Feedback Channel (PSFCH).

20. The network device of claim 18, wherein the proces-sor is configured to perform at least one of:
scheduling a retransmission resource for the first terminal device while a retransmission timer of the second terminal device is running;
scheduling a retransmission resource for the first terminal device while an on-duration timer of the second termi-nal device is running;
scheduling a retransmission resource for the first terminal device while an inactivity timer of the second terminal device is running; or
scheduling a retransmission resource for the first terminal device while the second terminal device waits for a Channel State Information (CSI) report after sending a CSI request.

* * * * *